United States Patent
Stempnik et al.

(10) Patent No.: US 8,160,796 B2
(45) Date of Patent: Apr. 17, 2012

(54) SECURING DRIVER REQUESTED TORQUE

(75) Inventors: Joseph M. Stempnik, Warren, MI (US); Ronald W. Van Diepen, Ann Arbor, MI (US); Jinchun Peng, Canton, MI (US); Mark H. Costin, Bloomfield Township, MI (US); Bryan D Lehman, Fenton, MI (US); Xuehan Kong, Farmington Hills, MI (US); Jonathan Packard, Madison Heights, MI (US)

(73) Assignee: GM Global Technology Operations LLC

( * ) Notice: Subject to any disclaimer, the term of this patent is extended or adjusted under 35 U.S.C. 154(b) by 382 days.

(21) Appl. No.: 12/565,340

(22) Filed: Sep. 23, 2009

(65) Prior Publication Data
US 2010/0217472 A1  Aug. 26, 2010

Related U.S. Application Data

(60) Provisional application No. 61/154,887, filed on Feb. 24, 2009.

(51) Int. Cl.
*G06F 19/00* (2006.01)
(52) U.S. Cl. ........... 701/84; 701/90; 701/54; 701/34; 123/403; 123/406.23

(58) Field of Classification Search .................. 701/90, 701/54, 103, 34, 84, 29; 123/403, 406.23
See application file for complete search history.

(56) References Cited

U.S. PATENT DOCUMENTS

| | | | |
|---|---|---|---|
| 6,704,638 B2 | 3/2004 | Livshiz | |
| 7,980,221 B2 * | 7/2011 | Baur et al. | 123/435 |
| 8,000,855 B2 * | 8/2011 | Bauerle et al. | 701/33 |
| 8,027,780 B2 * | 9/2011 | Whitney et al. | 701/110 |
| 2009/0012665 A1 * | 1/2009 | Brennan et al. | 701/22 |
| 2009/0024263 A1 * | 1/2009 | Simon et al. | 701/22 |
| 2010/0222953 A1 * | 9/2010 | Tang | 701/22 |
| 2010/0241335 A1 * | 9/2010 | Aso | 701/103 |
| 2010/0304923 A1 * | 12/2010 | Schenk et al. | 477/5 |

* cited by examiner

*Primary Examiner* — Ronnie Mancho (57) ABSTRACT

An engine control system comprises a driver axle torque request module (DATRM) and a driver axle torque security module (DATSM). The DATRM determines a pedal torque request based on minimum and maximum scaling torques and a torque scalar. The DATRM determines a raw driver torque request. The DATRM selectively shapes raw driver torque request into a final driver torque request. The DATRM converts the final driver torque request into a first axle torque request. The DATSM selectively diagnoses a fault in the first axle torque request based on a minimum engine torque, the minimum scaling torque, a first comparison of the final driver torque request and the redundant final driver torque request, and a second comparison of the first axle torque request and a redundant axle torque request.

18 Claims, 7 Drawing Sheets

SECURING DRIVER REQUESTED TORQUE

CROSS-REFERENCE TO RELATED APPLICATIONS

This application claims the benefit of U.S. Provisional Application No. 61/154,887, filed on Feb. 24, 2009. The disclosure of the above application is incorporated herein by reference in its entirety.

FIELD

The present disclosure relates to engine control and more particularly to securing driver requested torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine system includes an engine that provides drive torque for a vehicle. The drive torque provided by the engine may be based on a driver request. The driver request may be an amount of drive torque requested by a driver (i.e. driver requested torque). Accurately determining the requested amount of drive torque ensures that actual drive torque represents the torque desired by the driver.

SUMMARY

An engine control system comprises a driver axle torque request module (DATRM) and a driver axle torque security module (DATSM). The DATRM determines a pedal torque request based on minimum and maximum scaling torques and a torque scalar. The DATRM determines a raw driver torque request. The DATRM selectively shapes raw driver torque request into a final driver torque request. The DATRM converts the final driver torque request into a first axle torque request. The DATSM selectively diagnoses a fault in the first axle torque request based on a minimum engine torque, the minimum scaling torque, a first comparison of the final driver torque request and the redundant final driver torque request, and a second comparison of the first axle torque request and a redundant axle torque request.

A method comprises determining a pedal torque request based on minimum and maximum scaling torques and a torque scalar; determining a raw driver torque request; selectively shaping raw driver torque request into a final driver torque request; converting the final driver torque request into a first axle torque request; and selectively diagnosing a fault in the first axle torque request based on a minimum engine torque, the minimum scaling torque, a first comparison of the final driver torque request and the redundant final driver torque request, and a second comparison of the first axle torque request and a redundant axle torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control system controls torque output of an engine based on a driver axle torque request. Various computations, calculations, and conversions may be made in order to determine the driver axle torque request. For example, a pedal torque request is determined based on driver inputs to an accelerator pedal. Shaping of the request may be implemented to provide the driver with a smooth driving feel when a tip-in or tip-out of the accelerator pedal may otherwise cause the driver to experience a "bump." The driver torque request, initially in terms of engine torque output (i.e., torque at a crankshaft), is also converted into an axle torque domain in terms of torque at the wheels.

Various sources may cause the driver axle torque request to vary from an expected driver axle torque request. In the engine control system of the present disclosure, the driver axle torque request is divided into sections and each section is monitored to determine whether a fault exists in the driver axle torque request. If a fault exists, the engine control system performs remedial actions so the engine does not produce an unrequested amount of torque.

Figure 1:
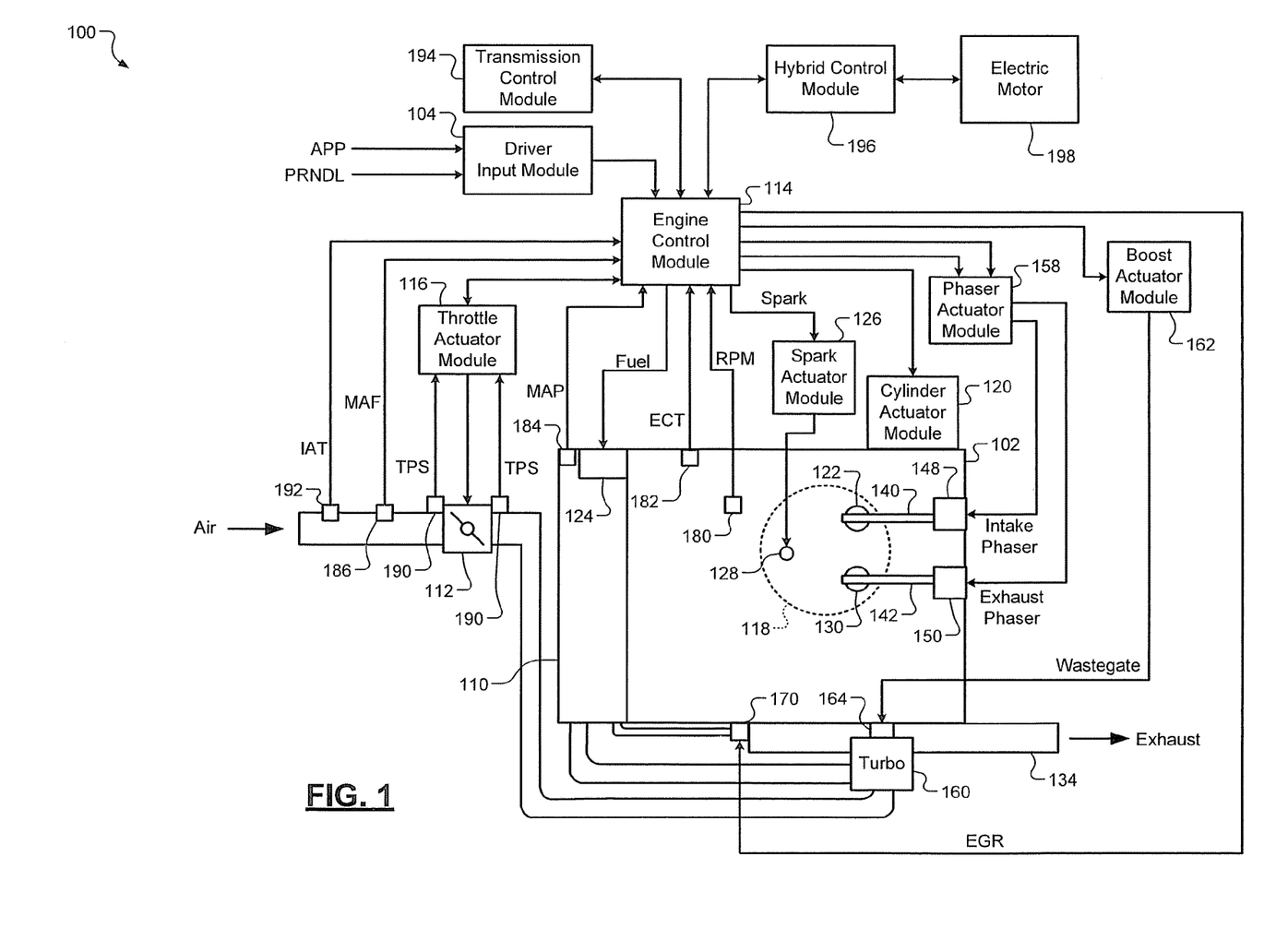
FIG. 1 is a functional block diagram of an exemplary engine system according to the principles of the present disclosure.

Referring now to FIG. 1, a functional block diagram of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which compression of the air/fuel mixture is maximized.

The combustion of the air/fuel mixture drives the piston down, thereby driving a rotating crankshaft (not shown). The piston returns to TDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

Figure 2:
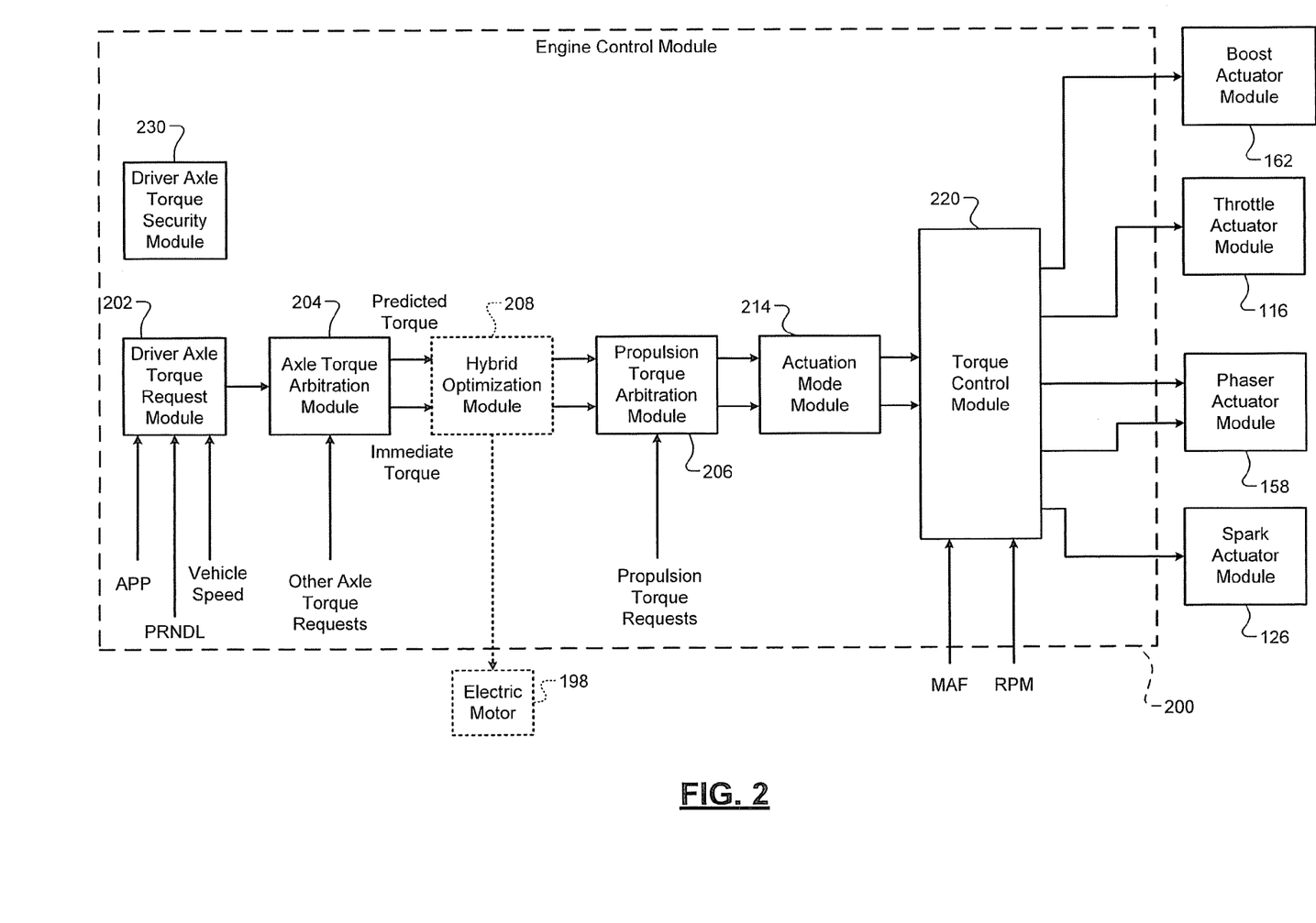
FIG. 2 is a functional block diagram of an exemplary engine control system according to the principles of the present disclosure.

The engine system 100 may include a boost device that provides pressurized air to the intake manifold 110. For example, FIG. 2 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Referring now to FIG. 2, an engine control module (ECM) 200 includes a driver axle torque request module (DATRM)

202. The DATRM 202 determines a driver torque request (in terms of engine torque output or torque at the crankshaft) based on a driver input received from the driver input module 104. For example only, the driver input may include accelerator pedal position.

The DATRM 202 converts the driver torque request into a driver axle torque request (in terms of torque at the wheels) based on the driver torque request. While the present disclosure will be discussed below in terms of a gasoline engine system, the principles of the present disclosure are also applicable to other types of engine systems including, but not limited to, diesel engine systems, hybrid engine systems, electric engine systems, and fuel cell engine systems.

The DATRM 202 transmits the driver axle torque request to an axle torque arbitration module 204. The axle torque arbitration module 204 arbitrates between the driver axle torque request and the other axle torque requests to determine a final axle torque request. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

In various implementations, the axle torque arbitration module 204 may output the predicted torque and immediate torque to a hybrid optimization module 208. The hybrid optimization module 208 determines how much torque should be produced by the engine and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from the axle torque domain (torque at the wheels) into a propulsion torque domain (torque at the crankshaft). This conversion may be done by the axle torque arbitration module 204, the propulsion torque arbitration module 206, or another suitable module. The propulsion torque arbitration module 206 arbitrates between the predicted and immediate torque and propulsion torque requests.

Propulsion torque requests may include torque reductions for engine over-speed protection and torque increases for stall prevention. Propulsion torque requests may also include torque requests from a speed control module, which may control engine speed during idle and coastdown, such as when the driver removes their foot from the accelerator pedal.

Propulsion torque requests may also include a clutch fuel cutoff, which may reduce engine torque when the driver depresses the clutch pedal in a manual transmission vehicle. Various torque reserves may also be provided to the propulsion torque arbitration module 206 to allow for fast realization of those torque values should they be needed. For example, a reserve may be applied for air conditioning compressor turn-on and for power steering pump torque demands.

A catalyst light-off or cold start emissions process may vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example, they may always win arbitration or may override arbitration altogether. The propulsion torque arbitration module 206 may still receive these requests so that, for example, appropriate data can be fed back to other torque requestors.

An actuation mode module 214 receives the predicted torque and the immediate torque from the propulsion torque arbitration module 206. Based upon a mode setting, the actuation mode module 214 determines how the predicted and immediate torques will be achieved. For example, changing the throttle valve 112 allows for a wide range of torque control. However, opening and closing the throttle valve 112 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 118 changes.

The throttle valve 112 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation mode module 214 takes in meeting the immediate torque request is determined by a mode setting. The mode setting provided to the actuation mode module 214 may include an inactive mode, a pleasible mode, a maximum range mode, and an auto actuation mode.

In the inactive mode, the actuation mode module 214 may disregard the immediate torque request. For example, the actuation mode module 214 may output the predicted torque to a torque control module 220. The torque control module 220 converts the predicted torque to desired actuator positions for the slower engine actuators. For example, the torque control module 220 may control desired manifold absolute pressure (MAP), desired throttle area, and/or desired air per cylinder (APC).

The torque control module 220 determines desired actuator positions for relatively faster engine actuators, such as desired spark advance. The actuation mode module 214 may instruct the torque control module 220 to set the spark advance to a calibrated value that achieves the maximum possible torque for a given airflow. In the inactive mode, the immediate torque request does not reduce the amount of torque produced or impact spark advance from calibrated values.

In the pleasible mode, the actuation mode module 214 may attempt to achieve the immediate torque request using only spark retard. For example, if the desired torque reduction is greater than the spark reserve capacity (i.e. an amount of torque reduction achievable by spark retard), the torque reduction will not be achieved. The actuation mode module 214 may output the predicted torque to the torque control module 220 for conversion to a desired throttle area. The actuation mode module 214 may output the immediate torque request to the torque control module 220, which will maximize spark retard to attempt to achieve the immediate torque.

In the maximum range mode, the actuation mode module 214 may instruct the cylinder actuator module 120 to turn off one or more cylinders to achieve the immediate torque request. The actuation mode module 214 may use spark retard for the remainder of the torque reduction by outputting the immediate torque request to the torque control module 220. If there is not enough spark reserve capacity, the actuation mode module 214 may reduce the predicted torque request output to the torque control module 220.

In the auto actuation mode, the actuation mode module 214 may decrease the predicted torque request output to the torque control module 220. The predicted torque may be reduced to allow the torque control module 220 to achieve the immediate torque request using spark retard.

The torque control module 220 determines an estimated torque and sets spark advance using the spark actuator module 126 to achieve the desired immediate torque. The estimated torque may represent an amount of torque that can be produced by setting the spark advance to produce the greatest torque. Accordingly, the torque control module 220 may select a spark advance that reduces the estimated torque to the immediate torque.

The torque control module 220 may receive a measured mass air flow (MAF) signal and an engine revolutions per minute (RPM) signal. The torque control module 220 generates a desired manifold absolute pressure (MAP) signal that may be used to control the boost actuator module 162. The boost actuator module 162 may control a turbocharger and/or a supercharger. The torque control module 220 outputs a desired area signal to the throttle actuator module 116. The throttle actuator module 116 regulates the throttle valve 112 to produce the desired throttle area.

The torque control module 220 generates a desired air per cylinder (APC) signal. Based on the desired APC signal and the RPM signal, the torque control module 220 commands the intake and/or exhaust cam phasers 148 and 150 to calibrated values using the phaser actuator module 158.

The torque control module 220 uses the commanded intake and exhaust cam phaser positions, as well as the MAF signal, to determine the estimated torque. Alternatively, the torque control module 220 may use actual or measured phaser positions. Further discussion of torque estimation can be found in commonly assigned U.S. Pat. No. 6,704,638 entitled "Torque Estimator for Engine RPM and Torque Control."

The ECM 200 according to the present disclosure also includes a driver axle torque security module (DATSM) 230. The DATSM 230 secures various aspects of the DATRM 202. More specifically, the DATSM 230 selectively diagnoses driver torque request faults. The DATSM 230 initiates remedial action when a driver torque request fault is diagnosed.

Figure 3A:
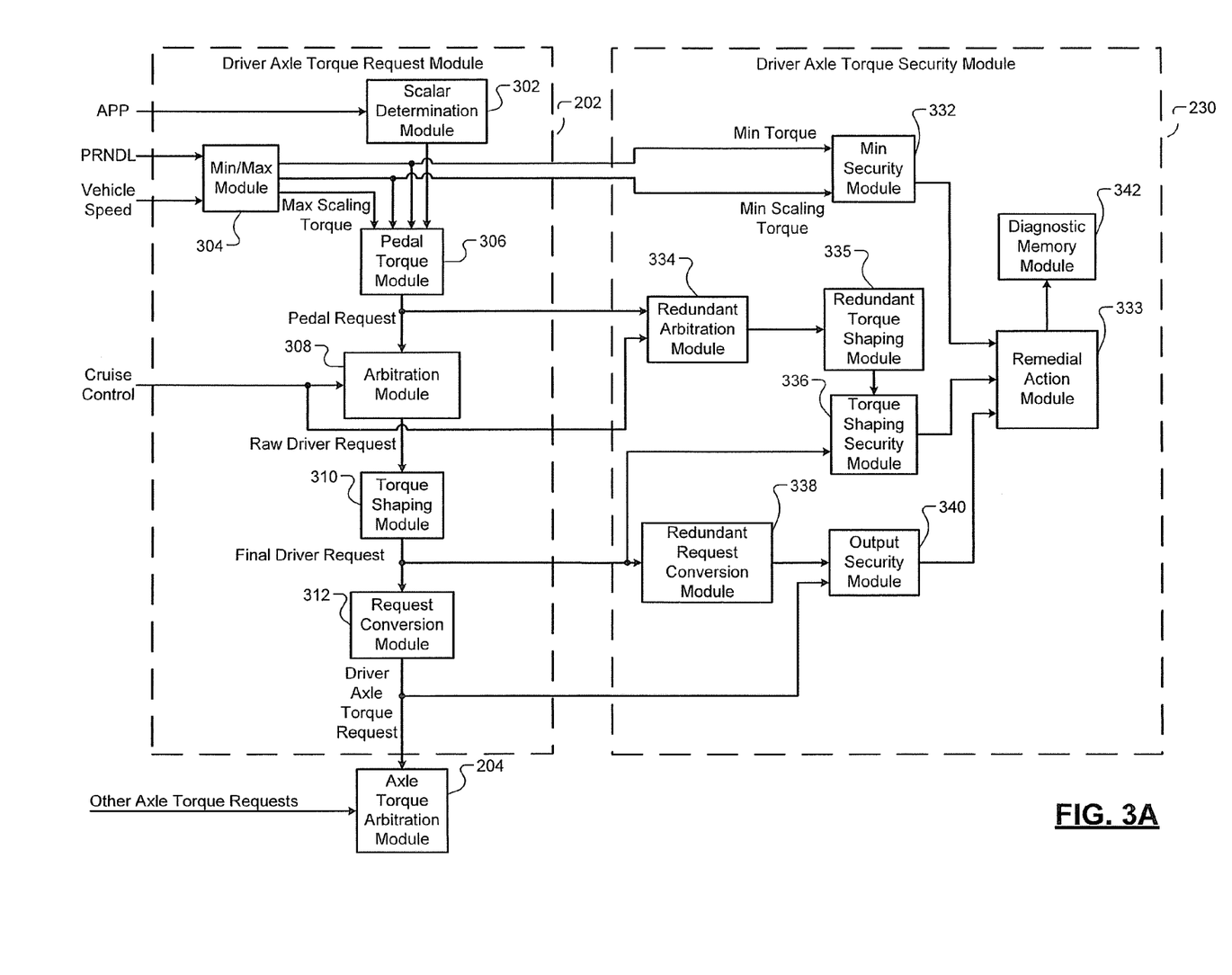
FIG. 3A is a functional block diagram of an exemplary implementation of a driver axle torque request module and a driver axle torque security module according to the principles of the present disclosure.

Referring now to FIG. 3A, functional block diagrams of exemplary implementations of the DATRM 202 and the DATSM 230 are presented. The DATRM 202 includes a scalar determination module 302, a min/max module 304, and a pedal torque module 306. The DATRM 202 also includes an arbitration module 308, a torque shaping module 310 and a request conversion module 312.

The scalar determination module 302 determines a torque scalar based on the accelerator pedal position (APP) and other suitable parameters. In one implementation, the torque scalar is expressed in terms of a percentage, between zero (0%) and one-hundred percent (100%). The scalar determination module 302 provides the torque scalar to the pedal torque module 306.

The min/max module 304 determines minimum and maximum scaling torques (min and max scaling torques). The min/max module 304 also determines a minimum torque (min torque). The maximum scaling torque corresponds to a maximum torque output that the engine 102 is capable of producing. The minimum torque corresponds to a minimum torque output of the engine 102 at which proper combustion may be maintained during idling.

The min/max module 304 determines the minimum scaling torque based on the vehicle speed and the position of a park, reverse, neutral, drive lever (PRNDL). For example only, the minimum scaling torque may be equal to the minimum torque when the vehicle speed is zero. As the vehicle speed increases, the minimum scaling torque may be increased. The vehicle speed may be based on engine output speed, transmission output speed, transmission input speed, wheel speed, and/or another suitable measure of vehicle speed.

The pedal torque module 306 determines a pedal request (i.e., a pedal torque request) based on the torque scalar and the minimum and maximum scaling torques. Based on the minimum and maximum scaling torques corresponding to zero and one-hundred percent, respectively, the pedal torque module 306 uses the torque scalar to determine the pedal request. For example only, for a torque scalar of fifty percent (50%), the pedal request may correspond to a torque that is half-way between the minimum and maximum scaling torques.

The arbitration module 308 arbitrates between the pedal request and cruise control torque requests. Other driver torque requests may also be arbitrated with the pedal and cruise control requests. The arbitration module 308 outputs a raw driver request (RDR) based on the winner of the arbitration.

The torque shaping module 310 selectively shapes the raw driver request to provide a smooth driving feel for a driver of the vehicle. For example only, the torque shaping module 310 may shape the raw driver request when the driver actuates or releases the accelerator pedal rapidly that causes fluctuations in the pedal request, which could cause the driver to experience a "bump." Such actuations and releases of the accelerator pedal are referred to as tip-in bumps and tip-out bumps, respectively. The shaping applied may be, for example, a filter, a rate limit, and/or another suitable smoothing technique.

The torque shaping module 310 outputs a final driver request (FDR) to the request conversion module 312. The final driver request may correspond to the shaped version of the raw driver request when shaping has been performed or the raw driver request when no shaping has been performed. The final driver request is in terms of torque at the crankshaft of the engine 102.

The request conversion module 312 converts the final driver request into the axle torque domain (torque at the wheels). In other words, the request conversion module 312 determines the driver axle torque request by converting the final driver request into the axle torque domain. The request conversion module 312 provides the driver axle torque request to the axle torque arbitration module 204 for arbitration with other axle torque requests.

The DATSM 230 includes a min security module 332, a remedial action module 333, a redundant arbitration module 334, a redundant torque shaping module 335, and a torque shaping security module 336. The DATSM 230 also includes a redundant request conversion module 338, an output security module 340, and a diagnostic memory module 342.

The min security module 332 selectively diagnoses driver torque request faults associated with the scaling of the driver torque request. The min security module 332 selectively diagnoses these driver torque request faults based on the minimum torque and the minimum scaling torque. The min security module 332 selectively diagnoses a driver torque request fault when the minimum torque is out of range. More specifically, the min security module 332 diagnoses a driver torque request fault when the minimum torque is less than a predetermined minimum torque or greater than a predetermined maximum torque.

The min security module 332 also diagnoses a driver torque request fault when the minimum scaling torque is out of the range. More specifically, the min security module 332 diagnoses a driver torque request fault when the minimum scaling torque is less than the predetermined minimum torque or greater than the predetermined maximum torque. The predetermined maximum torque may be calibratable and may set to, for example, a torque value greater than the maximum scaling torque. The min security module 332 triggers the remedial action module 333 when a driver torque request fault is diagnosed.

The redundant arbitration module 334 receives the pedal request and the cruise control requests. The redundant arbitration module 334 arbitrates between the pedal request and cruise control torque requests. Other driver torque requests may also be arbitrated with the pedal and cruise control requests. The arbitration may be performed similarly or identically to that performed by the arbitration module 308. The redundant arbitration module 334 outputs a redundant raw driver request (RRDR) based on the winner of the arbitration.

The redundant torque shaping module 335 receives the redundant raw driver request from the redundant arbitration module 334. The redundant torque shaping module 335 also receives the final driver request from the DATRM 202. The redundant torque shaping module 335 outputs a redundant final driver request (RFDR). For example only, the redundant torque shaping module 335 may set the redundant final driver request based on one of the redundant raw driver request and the final driver request. The setting of the redundant final driver request is discussed further below with respect to FIG. 4. When the raw driver request is shaped, the redundant torque shaping module 335 allows a predetermined period of time for the shaping. The predetermined period may be calibratable and may be set to, for example only, approximately 900 ms.

The torque shaping security module 336 selectively diagnoses driver torque request faults associated with the shaping of the raw driver request. The torque shaping security module 336 receives the final raw driver request from the DATRM 202 and the redundant final driver request from the redundant torque shaping module 335.

The torque shaping security module 336 monitors the final and redundant final driver requests and selectively diagnoses a driver torque request fault based on a comparison of the final and redundant final driver requests. For example only, the torque shaping security module 336 may implement an X out - Of -Y fault diagnostic strategy in diagnosing whether a driver torque request fault has occurred. Other modules, such as the min security module 332 and the output security module 340, may also employ X - out of -Y fault diagnostic strategies in diagnosing driver torque request faults.

The torque shaping security module 336 may increment an X counter each time that the final driver request deviates from the redundant final driver request by more than a predetermined amount or percentage. The Y counter may be incremented each time that the final and redundant final driver requests are compared. The torque shaping security module 336 may compare the final and redundant final driver requests at a predetermined sampling interval (e.g., once every 100 ms) or at the same frequency as they are calculated. The torque shaping security module 336 may diagnose the driver torque request fault when the X counter exceeds a predetermined fault value before the Y counter reaches a predetermined total value. The torque shaping security module 336 also triggers the remedial action module 333 when a driver torque request fault is diagnosed.

The redundant request conversion module 338 also receives the final driver request from the DATRM 202. The redundant request conversion module 338 performs a redundant conversion of the final driver request into the axle torque domain. In other words, the redundant request conversion module 338 determines a redundant driver axle torque request by converting the final driver request into the axle torque domain. The redundant conversion may be performed similarly or identically to the conversion performed by the request conversion module 312.

The output security module 340 selectively diagnoses driver torque request faults associated with the conversion of the driver torque request into the axle torque domain. The output security module 340 selectively diagnoses driver torque request faults based on a comparison of the driver axle torque request and the redundant driver axle torque request. More specifically, the output security module 340 diagnoses a driver torque request fault when the driver axle torque request is out of range of the redundant driver axle torque request.

For example only, the output security module 340 diagnoses a driver torque request fault when the driver axle torque request is greater than the redundant driver axle torque request by more than a predetermined acceleration torque. In other words, the output security module 340 diagnoses a driver torque request fault when the redundant driver axle torque request is greater than a sum of the driver axle torque request and the predetermined acceleration torque. In this manner, the sum of the driver axle torque request and the predetermined acceleration torque define the upper boundary of the range. The predetermined acceleration torque may be calibratable and may be set, for example, to a torque that may cause the vehicle to accelerate at a rate of 0.2 g over a period of 200 MS.

The lower boundary of the range may be determined based on whether the driver axle torque request is positive or negative. For example only, the lower boundary of the range may correspond to a predetermined deceleration torque when the driver axle torque request is positive. When the driver axle torque request is negative, the predetermined deceleration torque may be used as an offset, and the lower boundary of the range may correspond to the driver axle torque request less the predetermined deceleration torque. The predetermined deceleration torque may be calibratable and may be set, for example, to a torque that may cause the vehicle to decelerate at a rate of 0.2 g over a period of 200 ms.

The output security module 340 diagnoses a driver torque request fault when the redundant driver axle torque request is less than the predetermined deceleration torque when the driver axle torque request is positive. When the driver axle torque request is negative, the output security module 340 diagnoses a driver torque request fault when the redundant driver axle torque request is less than the driver axle torque request by more than the predetermined deceleration torque offset. The output security module 340 also triggers the remedial action module 333 when a driver torque request fault is diagnosed.

Figure 3B:
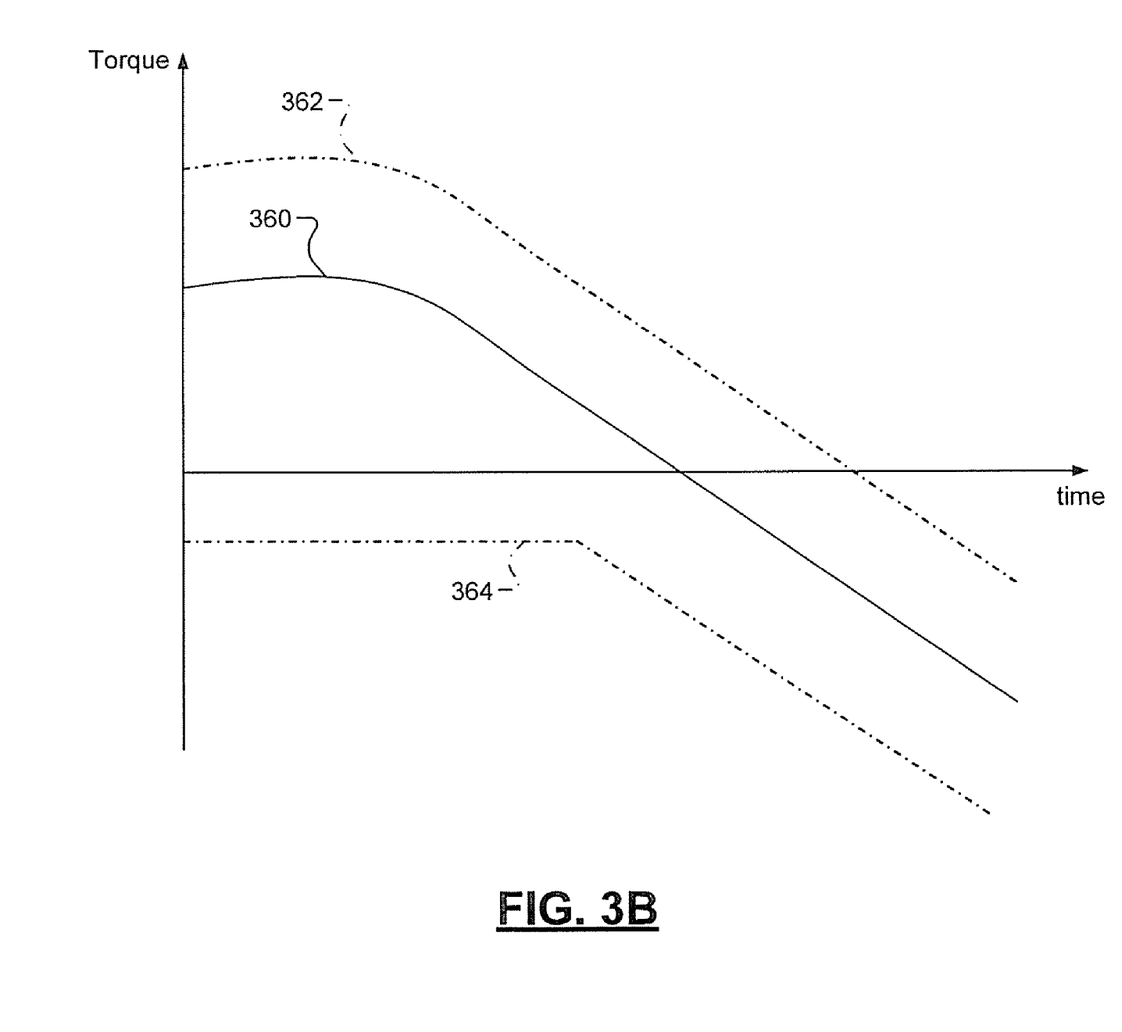
FIG. 3B is an exemplary graph of torque versus time.

FIG. 3B is an exemplary graph of torque versus time. Trace 360 tracks an exemplary driver axle torque request. Dashed traces 362 and 364 track exemplary upper and lower boundaries of the range, respectively, as described above. The output security module 340 diagnoses a driver torque request fault when the driver axle torque request is out of range of the redundant driver axle torque request.

The remedial action module 333 may be located within the DATRM 202, the DATSM 230, the ECM 200, or in another suitable location. When the remedial action module 333 is triggered (i.e., when a driver torque request fault has been diagnosed), the remedial action module 333 may take remedial actions. For example only, the remedial action module 333 may illuminate a malfunction indicator lamp (MIL) and set a fault code in the diagnostic memory module 342. The remedial action module 333 may also limit the engine torque output to a predetermined idle torque or shutdown the engine 102 when the remedial action module 333 is triggered. The fault code set in the diagnostic memory module 342 may be specified according to the reason for the diagnosis and/or the module that diagnosed the driver torque request fault.

Figure 4A:
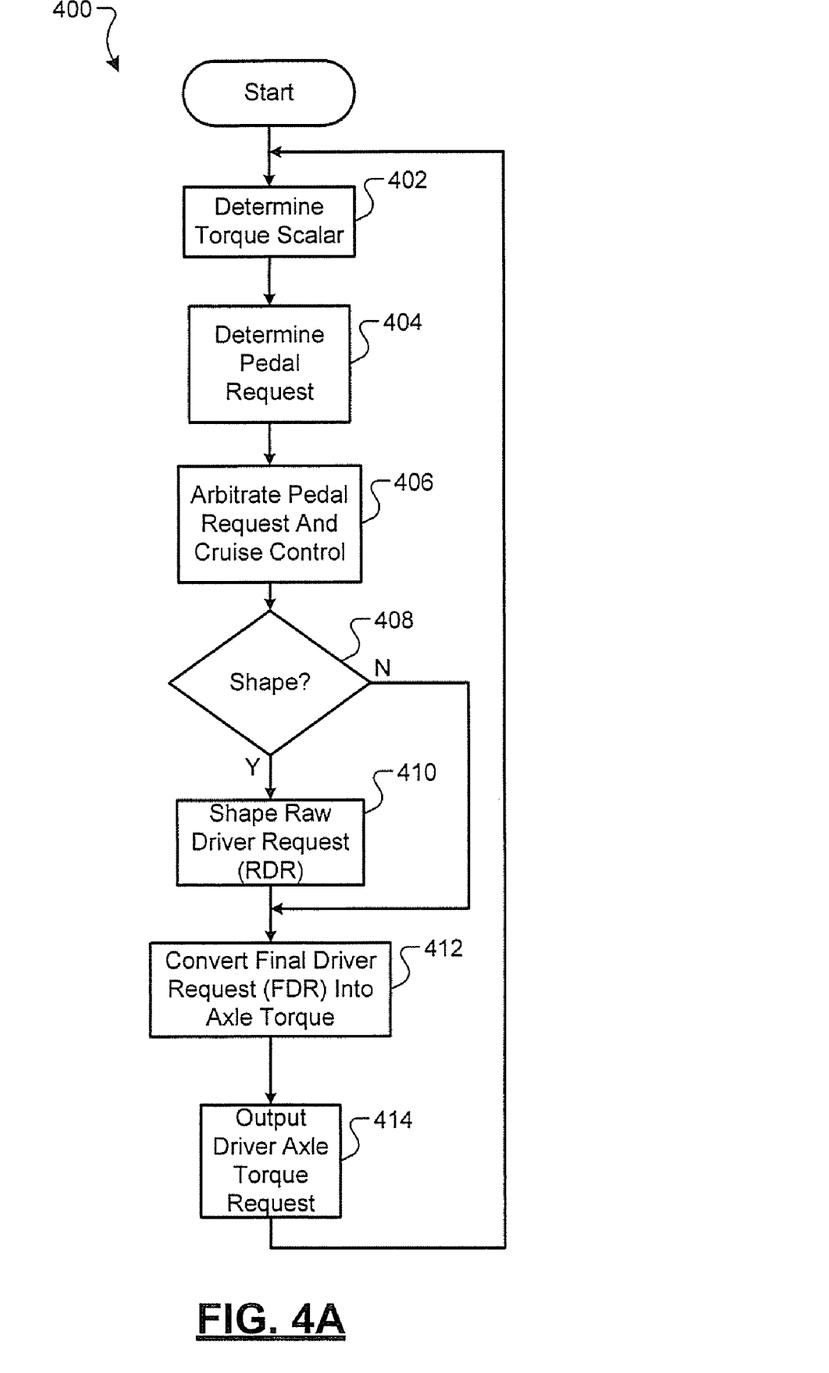
FIG. 4A is a flowchart that depicts exemplary steps performed in determining a driver axle torque request in a primary path according to the principles of the present disclosure.

Referring now to FIG. 4A, a flowchart depicting an exemplary method 400 of determining a driver axle torque request is presented. The method 400 begins in step 402 where the method 400 determines the torque scalar. The method 400 determines the pedal request in step 404. The pedal request is determined based on scaling between the minimum scaling torque and the maximum scaling torque using the torque scalar.

In step 406, the method 400 arbitrates the pedal request with cruise control requests. Other driver torque requests may also be arbitrated in step 406. The winner of the arbitration is referred to as the raw driver request (RDR). The method 400 determines whether to shape the raw driver request in step 408. If false, the method 400 transfers to step 412. If true, the method 400 shapes the raw driver request in step 410 before continuing to step 412. The method 400 may shape the raw driver request, for example, when a tip-in or tip-out that could cause the driver to experience a bump is detected.

The shaped (from step 410) or unshaped (from step 408) raw driver request is referred to as the final driver request (FDR). The method 400 converts the final driver request into the axle torque domain in step 412. In other words, the method 400 determines the driver axle torque request in step 412 by converting the final driver request into the axle torque domain. The method 400 outputs the driver axle torque request in step 414 for arbitration with other axle torque requests and returns to step 402.

Figure 4B:
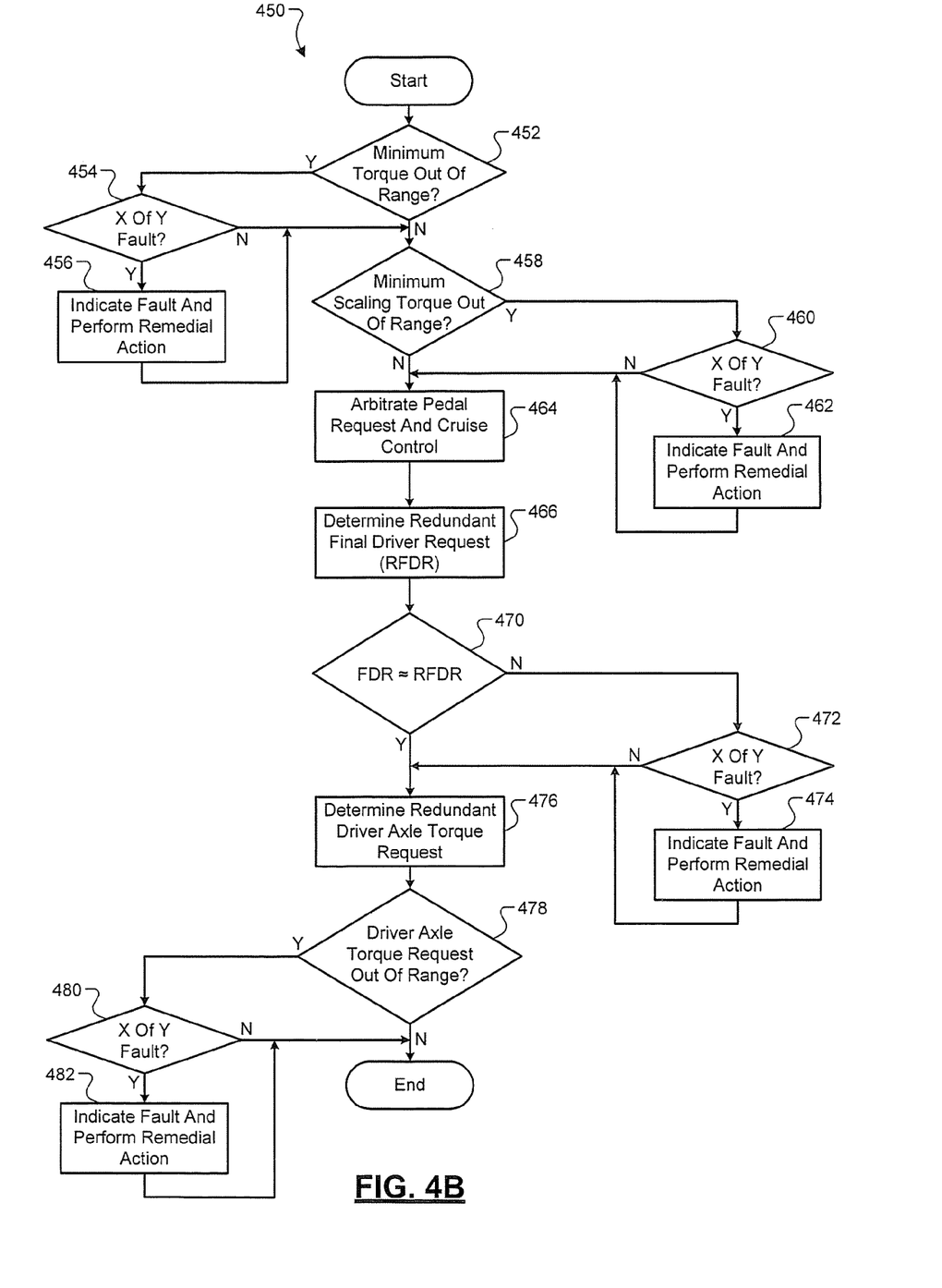
FIG. 4B is a flowchart that depicts exemplary steps performed in securing a driver axle torque request according to the principles of the present disclosure.

Referring now to FIG. 4B, a flowchart depicting an exemplary method 450 of securing a driver axle torque request is presented. The method 450 begins in step 452 where the method 450 determines whether the minimum torque is out of range. If true, the method 450 transfers to step 454; if false, the method 450 continues to step 458, which is discussed further below.

In step 454, the method 450 determines whether an X out - of - Y fault has occurred. In other words, the method 450 determines whether the X counter is greater than the predetermined fault value within the last Y number of out of range determinations. If true, the method 450 diagnoses a driver torque request fault in step 456, performs remedial actions, and transfers to step 458. If false, the method 450 transfers to step 458. Remedial actions taken may include, for example, illuminating the MIL, setting a fault code in diagnostic memory, shutting down the engine 102, or limiting the engine torque output to an idling torque.

The method 450 determines whether the minimum scaling torque is out of range in step 458. If true, the method 450 transfers to step 460; if false, the method 450 continues to step 464, which is discussed further below. In step 460, the method 450 determines whether an X out - of -Y fault has occurred. If true, the method 450 diagnoses a driver torque request fault in step 462, performs remedial actions, and transfers to step 464. If false, the method 450 transfers to step 464.

In step 464, the method 450 arbitrates the pedal request with cruise control requests. Other driver torque requests may also be arbitrated in step 406. The winner of the arbitration is referred to as the redundant raw driver request (RRDR). The method 450 determines the redundant final driver request (RFDR) in step 466 and continues to step 470. The determination of the redundant final driver request is discussed with respect to FIG. 4C below.

The method 450 determines whether the final driver request is approximately equal to the redundant final driver request in step 470. In other words, the method 450 determines whether the final driver request is within a predetermined amount or percentage of the redundant final driver request in step 470. If true, the method 450 continues to step 476, which is discussed further below. If false, the method 450 transfers to step 472.

In step 472, the method 450 determines whether an X out - of -Y fault has occurred. If true, the method 450 diagnoses a driver torque request fault in step 474, performs remedial actions, and transfers to step 476. If false, the method 450 transfers to step 476. The method 450 determines the redundant driver axle torque request in step 476. The method 450 determines the redundant driver axle torque request by converting the final driver request into the axle torque domain.

The method 450 determines whether the driver axle torque request is out of range of the redundant driver axle torque request in step 478. If true, the method 450 transfers to step 480; if false, the method 450 ends. The method 450 determines whether an X out - of -Y fault has occurred in step 480. If true, the method 450 diagnoses a driver torque request fault in step 482, performs remedial actions, and ends. If false, ends.

Figure 4C:
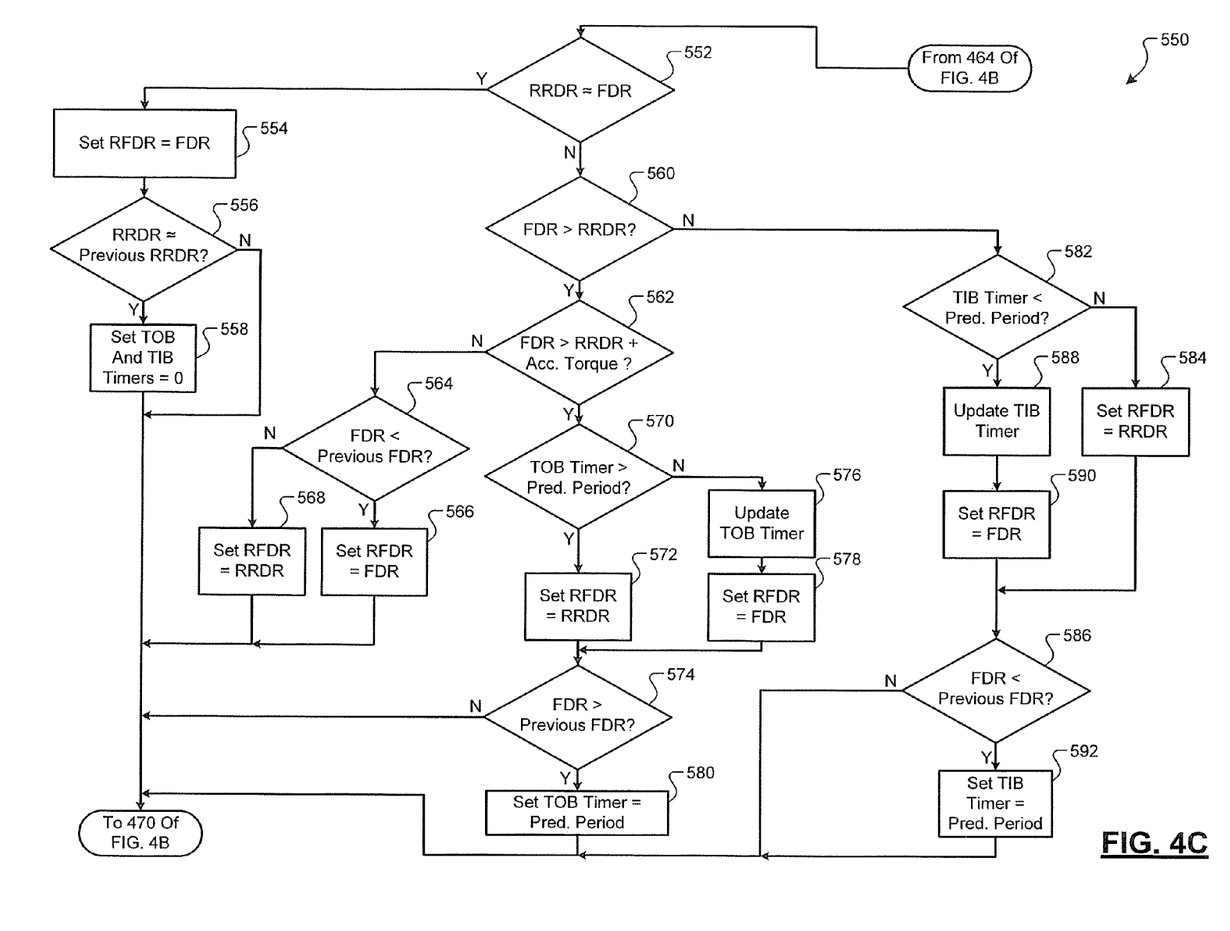
FIG. 4C is a flowchart that depicts an exemplary method of determining a redundant final driver request that is used in securing the driver axle torque request according to the principles of the present disclosure.

Referring now to FIG. 4C, a flowchart depicting exemplary method 550 of determining the redundant final driver request is presented. The method 550 may begin in step 552 after step 464 of FIG. 4B is performed. The method 500 may take the place of step 466 of FIG. 4B. The method 550 determines whether the redundant raw driver request is approximately equal to the final driver request in step 552. In other words, the method 550 determines whether the redundant raw driver request is within a predetermined amount or percentage of the final driver request in step 552. If true, the method 550 continues to step 554. If false, the method 550 transfers to step 560, which is discussed further below.

The method 550 sets the redundant final driver request equal to the final driver request in step 554 and determines whether the redundant raw driver request is approximately equal to a previous redundant raw driver request in step 556. In other words, the method 550 determines whether the redundant raw driver request is within a predetermined amount or percentage of the previous redundant raw driver request in step 556. If true, the method 550 sets a tip-out bump (TOB) timer and a tip-in bump (TIB) timer equal to zero and returns to step 470 of FIG. 4B. If false, the method 550 returns to step 470. The previous redundant raw driver request may include, for example, a redundant raw driver request determined during a last control loop.

In step 560 (i.e., when the redundant raw driver request is not approximately equal to the final driver request in step 552), the method 550 determines whether the final driver request is greater than the redundant raw driver request. If true, the method 550 continues to step 562. If false, the method 550 transfers to step 582, which is discussed further below.

The method 550 determines whether the final driver request is greater than the redundant raw driver request by at least the predetermined acceleration torque (Acc. Torque) in step 562. If true, the method 550 continues to step 570, which is discussed further below. If false, the method 550 transfers to step 564. The method 550 determines whether the final driver request is less than a previous final driver request in step 564. If true, the method 550 sets the redundant final driver request equal to the final driver request in step 566 and returns to step 470 of FIG. 4B. If false, the method 550 sets the redundant final driver request equal to the redundant raw driver request in step 568 and returns to step 470. The previous final driver request may include, for example, a final driver request determined during a last control loop.

In step 570 (i.e., when the final driver request is not greater than the redundant raw driver request by at least the predetermined acceleration torque in step 562), the method 550 determines whether the TOB timer is greater than the predetermined period. If true, the method 550 sets the redundant final driver request equal to the redundant raw driver request in step 572 and continues to step 574. If false, the method 550 updates (e.g., increments) the TOB timer and sets the redundant final driver request equal to the final driver request in steps 576 and 578, respectively, before continuing to step 574. The predetermined period may be calibratable and may be set to, for example, approximately 900 ms.

The method 550 determines whether the final driver request is greater than the previous final driver request in step 574. If true, the method 550 sets the TOB equal to the predetermined period in step 580 and returns to step 470 of FIG. 4B. If false, the method 550 returns to step 470. In this manner, the redundant final driver request will be set equal to the redundant raw driver request after future performances of step 570 unless the TOB timer is first reset (e.g., in step 558).

In step 582 (i.e., when the final driver request is not greater than the redundant raw driver request in step 560), the method 550 determines whether the TIB timer is less than the predetermined period. If false, the method 550 sets the redundant final driver request equal to the redundant raw driver request in step 584 and continues to step 586. If true, the method 550 updates (e.g., increments) the TIB timer and sets the redundant final driver request equal to the final driver request in steps 588 and 590, respectively, before proceeding to step 586.

The method 550 determines whether the final driver request is less than the previous final driver request in step 586. If true, the method sets the TIB timer equal to the predetermined period in step 592 and returns to step 470 of FIG. 4B. If false, the method returns to step 470. In this manner, the redundant final driver request will be set equal to the redundant raw driver request in future performances of step 582 unless the TOB timer is first reset (e.g., in step 558).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a driver axle torque request module (DATRM) that determines a pedal torque request based on minimum and maximum scaling torques and a torque scalar, that determines a raw driver torque request, that selectively shapes raw driver torque request into a final driver torque request, and that converts said final driver torque request into a first axle torque request; and
a driver axle torque security module (DATSM) that selectively diagnoses a fault in said first axle torque request based on a minimum engine torque, said minimum scaling torque, a first comparison of said final driver torque request and a redundant final driver torque request, and a second comparison of said first axle torque request and a redundant axle torque request.

2. The engine control system of claim 1 wherein said DATSM diagnoses said fault when said minimum scaling torque is one of greater than a predetermined maximum torque limit and less than a predetermined minimum torque limit.

3. The engine control system of claim 2 wherein said DATSM diagnoses said fault when said minimum torque is one of greater than said maximum torque limit and less than said predetermined minimum torque limit.

4. The engine control system of claim 1 wherein said DATSM diagnoses said fault when said final driver torque request is one of greater than and less than said redundant final driver torque request.

5. The engine control system of claim 1 wherein said DATSM sets said redundant final driver torque request equal to one of said final driver torque request and a redundant raw driver torque request before said first comparison is performed.

6. The engine control system of claim 1 wherein said DATRM limits a rate of shaping of said final driver torque request toward said pedal torque request.

7. The engine control system of claim 1 wherein said DATSM diagnoses said fault when said redundant axle torque request is greater than a sum of said first axle torque request and a predetermined acceleration torque.

8. The engine control system of claim 1 wherein, when said first axle torque request is positive, said DATSM diagnoses said fault when said redundant axle torque request is less than a predetermined deceleration torque that is less than zero.

9. The engine control system of claim 1 wherein, when said first axle torque request is positive, said DATSM diagnoses said fault when said redundant axle torque request is less than a difference between a redundant axle torque request and a magnitude of a predetermined deceleration torque offset.

10. A method comprising:
   determining a pedal torque request based on minimum and maximum scaling torques and a torque scalar;
   determining a raw driver torque request;
   selectively shaping the raw driver torque request into a final driver torque request;
   converting said final driver torque request into a first axle torque request; and
   selectively diagnosing a fault in said first axle torque request based on a minimum engine torque, said minimum scaling torque, a first comparison of said final driver torque request and a redundant final driver torque request, and a second comparison of said first axle torque request and a redundant axle torque request.

11. The method of claim 10, further comprising diagnosing said fault when said minimum scaling torque is one of greater than a predetermined maximum torque limit and less than a predetermined minimum torque limit.

12. The method of claim 11, further comprising diagnosing said fault when said minimum torque is one of greater than said maximum torque limit and less than said predetermined minimum torque limit.

13. The method of claim 10, further comprising diagnosing said fault when said final driver torque request is one of greater than and less than said redundant final driver torque request.

14. The method of claim 10, further comprising setting said redundant final driver torque request equal to one of said final driver torque request and a redundant raw driver torque request before said first comparison is performed.

15. The method of claim 10, further comprising limiting a rate of shaping of said final driver torque request toward said pedal torque request.

16. The method of claim 10, further comprising diagnosing said fault when said redundant axle torque request is greater than a sum of said first axle torque request and a predetermined acceleration torque.

17. The method of claim 10, further comprising diagnosing said fault when said first axle torque request is positive and when said redundant axle torque request is less than a predetermined deceleration torque that is less than zero.

18. The method of claim 10, further comprising diagnosing said fault when said first axle torque request is positive and when said redundant axle torque request is less than a difference between a redundant axle torque request and a magnitude of a predetermined deceleration torque offset.

* * * * *